United States Patent
Junker (12)

(10) Patent No.: US 10,576,602 B2
(45) Date of Patent: Mar. 3, 2020

(54) METHOD FOR THE COMPLETE GRINDING OF WORKPIECES IN THE FORM OF SHAFTS HAVING CYLINDRICAL AND PROFILED SECTIONS

(71) Applicant: Erwin Junker Maschinenfabrik GmbH, Nordrach (DE)

(72) Inventor: Erwin Junker, Buehl/Baden (DE)

(73) Assignee: Erwin Junker Maschinenfabrik GmbH, Nordrach (DE)

( * ) Notice: Subject to any disclaimer, the term of this patent is extended or adjusted under 35 U.S.C. 154(b) by 0 days.

(21) Appl. No.: 15/566,281

(22) PCT Filed: Mar. 3, 2017

(86) PCT No.: PCT/EP2017/055049
§ 371 (c)(1),
(2) Date: Oct. 13, 2017

(87) PCT Pub. No.: WO2017/157698
PCT Pub. Date: Sep. 21, 2017

(65) Prior Publication Data
US 2018/0369983 A1    Dec. 27, 2018

(30) Foreign Application Priority Data
Mar. 15, 2016 (DE) .................. 10 2016 204 273

(51) Int. Cl.
*B24B 27/00* (2006.01)
*B24B 19/00* (2006.01)
(Continued)

(52) U.S. Cl.
CPC ............ *B24B 27/0076* (2013.01); *B23F 1/02* (2013.01); *B23Q 3/155* (2013.01); *B24B 5/04* (2013.01);
(Continued)

(58) Field of Classification Search
CPC ..... B24B 27/0076; B24B 5/04; B24B 19/022; B24B 41/062; B24B 41/065; B24B 53/053; B23F 1/02; F04C 2230/10; F04C 2240/20
(Continued)

(56) References Cited

U.S. PATENT DOCUMENTS 2,547,981 A * 4/1951 Scone ................. B24B 3/02
451/220
3,811,234 A * 5/1974 Soares, Jr. ............ B23P 15/32
451/54
(Continued)

FOREIGN PATENT DOCUMENTS

DE           19921785 B4   11/2005
DE       102010005630 A1    7/2011
(Continued)

OTHER PUBLICATIONS

International Search Report for international application PCT/EP2017/055049, dated Jul. 12, 2017.

*Primary Examiner* — George B Nguyen
(74) *Attorney, Agent, or Firm* — Marshall, Gerstein & Borun LLP

(57) ABSTRACT

Described is a method for grinding workpieces, which comprise at least one cylindrical and profiled portion each, on one and the same grinding machine. The workpiece is ground initially in a first grinding operation in a first clamping in the grinding machine, said first grinding operation being followed by a second grinding operation once the first clamping has been released and then, before the start of the second grinding operation, a second clamping has been generated.

10 Claims, 9 Drawing Sheets

(51) Int. Cl.
*B24B 19/02* (2006.01)
*B23F 1/02* (2006.01)
*B24B 41/06* (2012.01)
*B24B 5/04* (2006.01)
*B24B 53/053* (2006.01)
*B23Q 3/155* (2006.01)

(52) U.S. Cl.
CPC .......... *B24B 19/009* (2013.01); *B24B 19/022* (2013.01); *B24B 41/062* (2013.01); *B24B 41/065* (2013.01); *B24B 53/053* (2013.01); *F04C 2230/10* (2013.01); *F04C 2240/20* (2013.01)

(58) Field of Classification Search
USPC ...................................... 451/49, 57–58, 403
See application file for complete search history.

(56) References Cited

U.S. PATENT DOCUMENTS

| | | | | |
|---|---|---|---|---|
| 3,918,216 A | * | 11/1975 | Best | B24B 27/0675 451/41 |
| 4,026,073 A | * | 5/1977 | Betzler | B24B 3/085 451/239 |
| 5,259,150 A | * | 11/1993 | Himmelsbach | B24D 7/18 451/58 |
| 5,759,085 A | * | 6/1998 | Gugenheimer | B24B 49/14 451/8 |
| 6,106,373 A | * | 8/2000 | Fabris | B23Q 1/621 451/11 |
| 6,120,356 A | * | 9/2000 | Jaskowiak | B24B 1/04 451/164 |
| 6,190,242 B1 | * | 2/2001 | Herrscher | B23Q 7/1436 451/177 |
| 6,306,018 B1 | * | 10/2001 | Coverdale | B24B 1/00 451/177 |
| 6,623,332 B1 | * | 9/2003 | Junker | B24B 5/04 451/5 |
| 6,878,043 B1 | * | 4/2005 | Junker | B24B 5/42 451/249 |
| 7,083,500 B2 | * | 8/2006 | Junker | B24B 5/12 451/10 |
| 7,147,547 B2 | * | 12/2006 | Junker | B24B 5/14 451/57 |
| 2004/0029497 A1 | * | 2/2004 | Baeumler | B24B 5/04 451/49 |
| 2010/0048104 A1 | * | 2/2010 | Junker | B24B 5/12 451/49 |
| 2017/0252886 A1 | * | 9/2017 | Junker | B24B 27/0061 |

FOREIGN PATENT DOCUMENTS

| | | |
|---|---|---|
| EP | 0334298 A2 | 9/1989 |
| WO | WO-2008104571 A1 | 9/2008 |
| WO | WO-2012100307 A8 | 12/2012 |

* cited by examiner

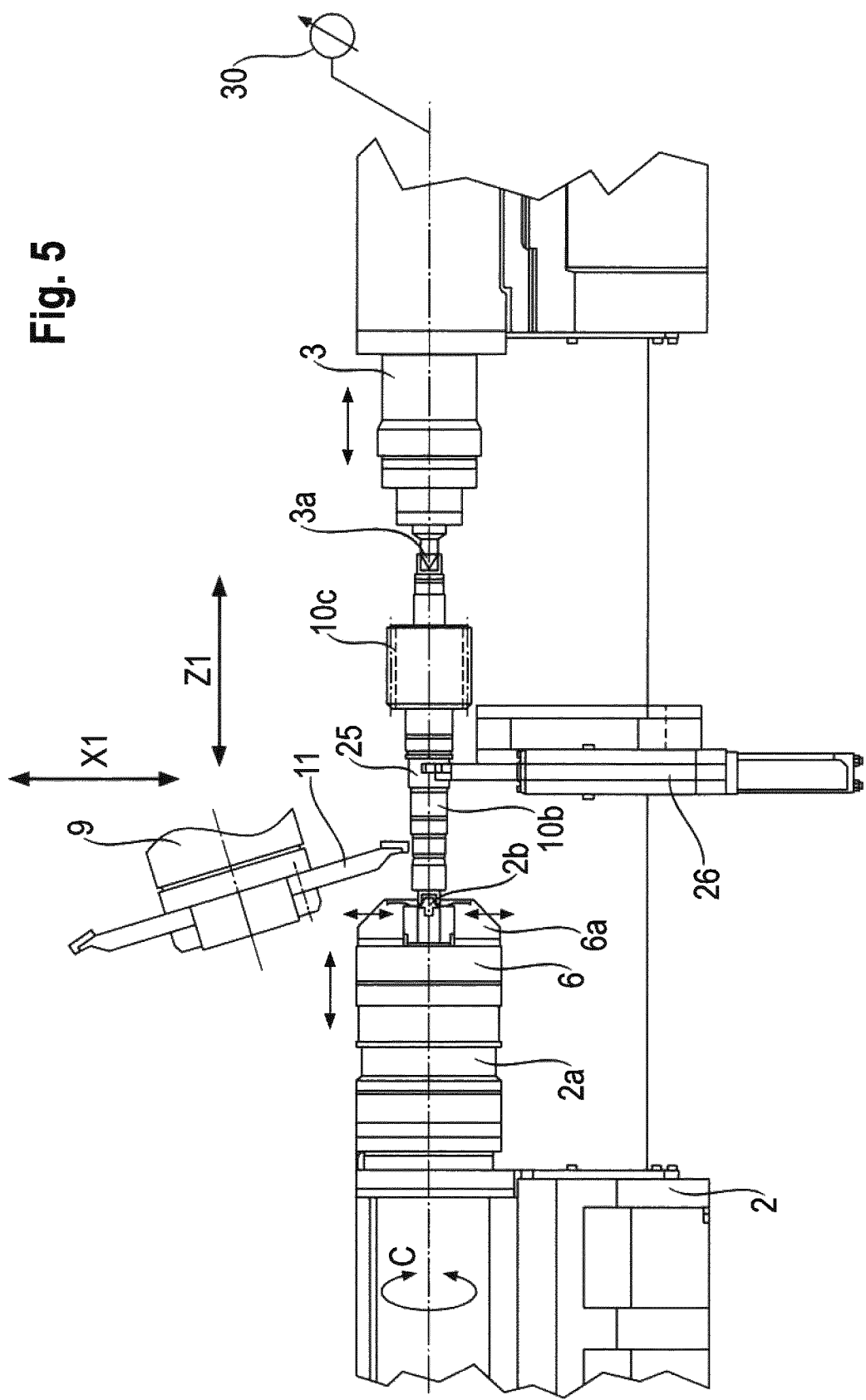

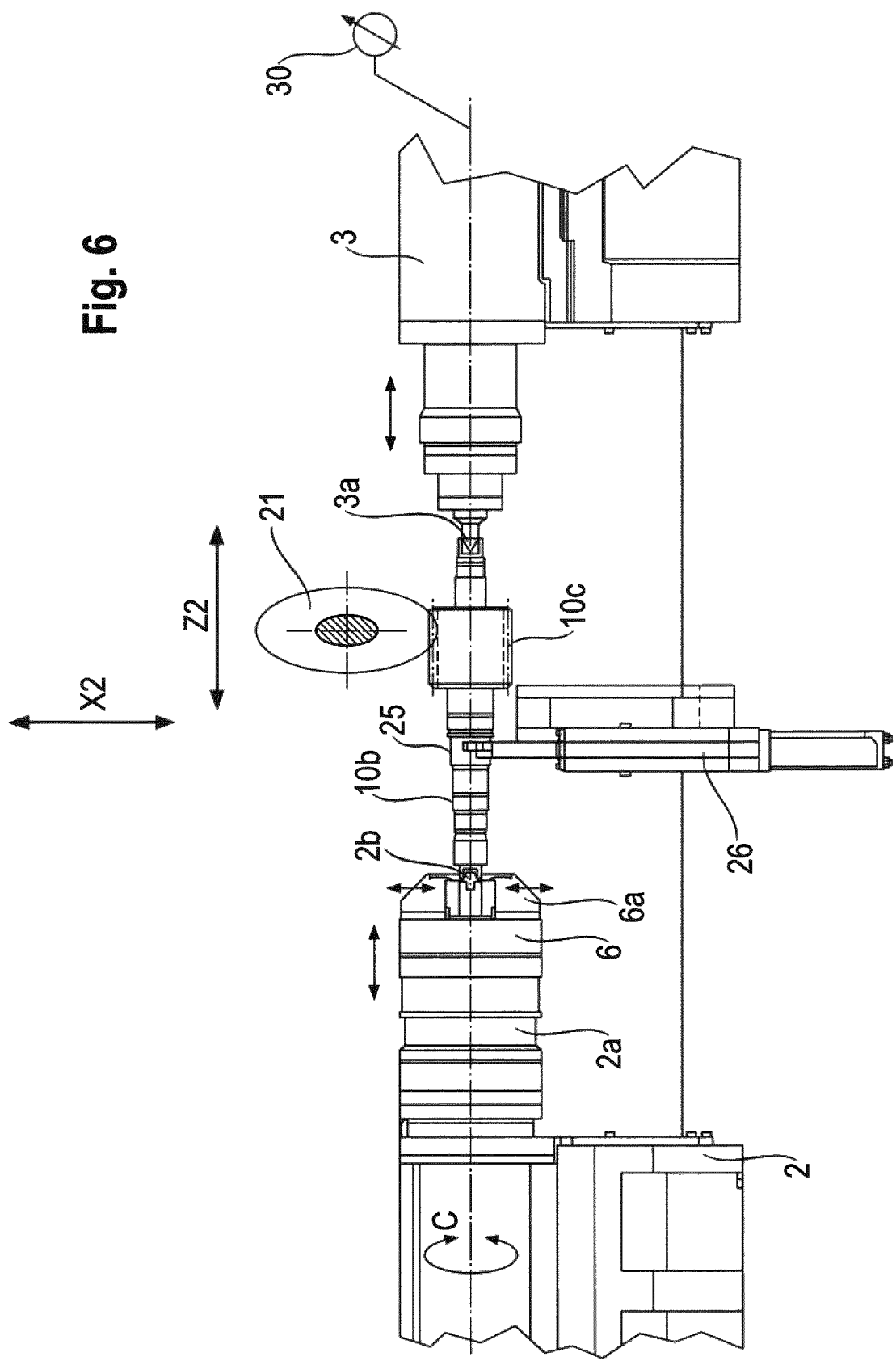

METHOD FOR THE COMPLETE GRINDING OF WORKPIECES IN THE FORM OF SHAFTS HAVING CYLINDRICAL AND PROFILED SECTIONS

CROSS-REFERENCE TO RELATED APPLICATIONS

This is the United States national phase of International Patent Application No. PCT/EP2017/055049, filed Mar. 3, 2017, which claims the priority benefit of German Application No. 10 2016 204 273.4, filed Mar. 15, 2016. Each of the foregoing is expressly incorporated herein by reference in the entirety.

FIELD OF THE DISCLOSURE

The invention relates to a method for grinding shaft-type workpieces, which comprise at least one cylindrical and profiled portion each, on one and the same grinding machine as a complete processing operation.

BACKGROUND

Within the framework of said invention, shaft-type workpieces are to be understood as, for example, gear shafts, rotors for hydraulic pumps or flow meters, rotors for vane pumps and rotors for, for example, compressors for compactors, blowers, vacuum pumps or similar applications. The invention described below, however, is also to be used in terms of a broader interpretation of the designation shaft-type workpieces on other shaft parts such as camshafts, crankshafts, etc. In the case of known methods for the complete grinding of shaft-type workpieces with cylindrical and profiled portions, as is the case, for example, with gear shafts, the necessary incisions, planar sides and diameters are generally ground in separate operating sequences and often also on one machine. In contrast, the profile portions or toothings which are also to be ground on the shaft-type workpieces are ground on separate machines. The use of several machines which are frequently arranged one behind another in the production process requires high investment in tooling machines and an additional requirement for space in the production halls. This also applies to rotor parts which comprise cylindrical and profile portions and are ground for the various applications in a similar manner.

Already disclosed, however, is grinding shaft-type workpieces with cylindrical and profile portions on one machine. The grinding of the cylindrical portions, in this case, also includes, as a rule, the grinding of planar shoulder faces which are present, for example, between adjacent cylindrical outer faces with various diameters. DE 199 21 785 B4 discloses a method for grinding convex running surfaces and outer diameters on shafts with at least one disk-shaped shaft portion and a corresponding grinding machine for implementing the method. The shaft part to be ground is to be ground in terms of complete processing both with reference to the cylindrical portion or the cylindrical portions and to the profile portions. The profile portions are described in the case of said method according to the exemplary embodiment described there as a disk-shaped shaft portion with a convexly curved surface. Such convexly curved surfaces provide profile portions. The disclosed method then is designed to grind all the grinding operations, i.e. one grinding operation to grind the convex end-face running surfaces on the disk-shaped shaft portion and a second grinding operation to grind the respective desired outer diameter or cylindrical portions of the shaft part, in one clamping position. This means that the workpiece remains clamped at least between tips between a workpiece headstock and a tailstock during the entire grinding process. Said clamping position is therefore not released during the entire processing operation.

WO 2012/100 307 A8 describes such a method for the complete grinding of shaft-type workpieces with cylindrical and profiled portions, the profiled portions being helically realized profiles for rotors of, for example, compressors. In the case of said method, the workpiece also remains fixedly clamped during the complete processing operation such that the clamping position is not released. Irrespective of how many grinding operations are carried out in terms of pre-grinding, finish-grinding, grinding a steady rest seat, grinding the cylindrical portions etc., the clamping position of the workpiece is assumed at the start of the grinding operation, and the workpiece remains clamped in said clamping position for the entire duration of the grinding operation.

This also corresponds to the technical expertise known in general today, according to which the workpieces are ground in one single clamping position on one machine to achieve tight tolerances and improved dimensional characteristics. The known expertise currently assumes that at each re-clamping, there are losses in production quality on account of re-clamping errors that may possibly occur.

DE 10 2010 005 630 A1 describes the fundamental technical design of a machine with which shaft-type workpieces can be processed according to previously acknowledged WO 2012/100 307 A8. In the case of said known grinding center, described above all certainly is that in addition it is possible for a hopper magazine to be arranged with cooling jets or cooling jet sets necessary for the changing of respective grinding disks, during the complete grinding operation carried out by means of said grinding center the workpiece also remains completely clamped.

GENERAL DESCRIPTION

In contrast, the object of the invention consists in increasing the production precision even further of such complex components with cylindrical and with profiled portions as the shaft-type workpieces to be ground here.

According to the method according to the invention for grinding workpieces, which comprise at least one cylindrical portion and profiled portion each, such complete processing is effected on one and the same grinding machine. In this case, the workpiece is ground in a first grinding operation in a first clamping position in the grinding machine, and then is ground in a second clamping position once the first clamping position has been released and a second clamping position of the workpiece has been generated.

Said method of operation according to the invention where namely clamping, which is effected on the same machine, is released in a targeted manner between individual grinding operations, and in fact without the workpiece having to be removed from the processing station, and the workpiece is then reclamped fixedly for the further processing thereof, as a rule using the same clamping means. Contrary to the prevailing opinion according to the knowledge of the average expert, it has been shown in a surprising manner that in the case of such a method of operation, where the clamping position is consciously and specifically released between the individual grinding operations, further improved production quality of the workpiece can be achieved after grinding, in particular with reference to dimensional and geometric tolerances. This is associated with the fact that when the workpieces are processed, for example with different grinding allowances during the machining process, the heat build-up varies. Said varying machining heat can lead to different thermal expansion or warping on the workpiece which can be compensated for by an intermediate relaxing of the clamping position.

A further reason is that in the production of the raw workpiece, different residual stresses are present or remain in the material, in particular when said workpieces, prior to grinding, are also exposed to special heat treatments such as, for example, hardening. In such a case, slight differences inside the admissible technical tolerances in the raw workpiece from different batches during production also have an effect, as in the case of the individual batches, the heat treatment conditions for the individual batches cannot be held 100% constant from batch to batch.

A further reason for residual stresses in the workpiece can be the result of whether, for example, scrap material is also used in the production of the raw material or of the raw workpiece, respectively, which in fact still lies within the admissible technical tolerances for the raw workpieces or the blank, but during subsequent processing steps can result in additional stresses and consequently in related deformation of the workpiece.

It is also usual in the case of the manufacturers of the shaft-type workpieces in question with cylindrical and profile portions that the materials for the raw workpieces are purchased with the identical specification from different producers, often even from different countries. Even if the specifications are identical, the workpieces behave in part quite differently during the grinding operation, in particular as a result of the releasing of inherent stresses. Said problem of the inherent stresses being released from the material structure during processing inevitably results in the finished workpieces having deviations in their dimensional and geometric tolerances in spite of the otherwise constant grinding process parameters. In this connection, variations in the dimensions of between μm and one hundredth of a millimeter are quite possible and usual. These types of variations are not acceptable, low-wear operation, corresponding sealing when the profiles turn and similar are to be ensured in particular for rotor shafts which are installed in screw rotors and have to mesh with one another very precisely as a pair of male and female rotor shafts. However, the temperature difference of the semi-finished parts which are fed to the grinding machine also exerts an influence on the precision. In this case, for example, the effect of the differences in temperature of the workpieces fed to the machine and the temperatures in the interior of the processing machine is in part no longer negligible. The effects of said temperature differences are all the stronger, the more marked the varying temperatures of the semi-finished part of the workpieces fed to the processing machine.

A further important point, which is significant for achieving an extremely high level of precision for such components, is the manner of the pre-processing. Thus, the raw parts or the raw workpieces, respectively, can be realized in such a manner that the grooves or toothings of the profile portions have already been pre-processed as a result of milling or other machining methods. In the case of cast parts or forged parts, it is also possible in part in the case of larger grooves or teeth for the grooves already to be pre-cast or pre-forged in their principle form, in which case they have a higher grinding tolerance than in the case of, for example, grooves or teeth that have already been milled when they are fed to the grinding machine. As the so-called cast skin is ground away during grinding, the risk of stresses being released is particularly high there as when the cast skin is ground away inherent stresses are released. The production quality can clearly be improved even more when all the previously named disadvantages are avoided. The improved production quality results from the fact that as a result of the intermediate releasing of the clamping position, which is effected moreover such that the positioning of the workpiece in the grinding machine is maintained, the warping of the workpiece is as it were "yielded to" during processing as a result of the grinding on account of the above-named reasons. This means that the workpiece is able to relax intermediately when the stress is released such that during subsequent grinding operations grinding can take place again on a relaxed and clamped workpiece. As already described, the warping of the workpiece is a result of the stresses in the structure of the workpiece being released during the processing of the workpiece. Above all, this relates, in particular, to the stresses on the surface of the workpiece at the points which are ground. As a result of releasing the clamping position of the workpiece, an at least largely stress-free workpiece is then actually able to be processed in a more precise manner in a subsequent new clamping position and grinding operation.

Generally, the workpieces are initially clamped in the machine, the workpieces being fixedly clamped in the machine between the tips, as is conventionally disclosed in the prior art. In order to be able to grind the profiled regions of the grooves or toothings, the workpiece has additionally also to be clamped radially in a play-free manner. This is preferably realized by a so-called compensating chuck. In the case of said chucks, the workpiece is centered by the tip in the chuck, and the clamping jaws bear against the workpiece at the diameter thereof in a compensating manner in the state clamped between the tips of the workpiece headstock and the tailstock, the clamping force, which is applied by said clamping, clamping the workpiece rigidly, i.e. free of play, in a compensating and radial manner.

In order to be able to drive the workpiece rotationally in a targeted program-controlled manner during processing, the chuck is fixedly mounted on a workpiece spindle, the workpiece being driven rotationally about the so-called C axis. In order also to be able to grind the shaft end on which the chuck clamps the workpiece, said chuck or the clamping jaws can be retracted in the open state. Consequently, the workpiece is released at the shaft-side end such that the clamping diameter can also be ground. In this connection, the workpiece is only still clamped between the centering tips. The friction between the driven centering tip and the center in the workpiece transmits the torque necessary for grinding to rotate the workpiece. The workpiece to be ground is clamped during the grinding operation in such a manner that it is clamped between the tips and is also fixedly clamped in a compensating manner for radial entrainment by the chuck. As the shaft parts generally have such a diameter-length ratio that they have to be supported during the processing, first of all a steady rest seat is preferably ground on the workpiece. This is, however, only necessary when the diameter-length ratio requires additional support.

According to a first embodiment, the grinding of the diameter and of the planar sides is preferably effected with a grinding disk which is realized for peel-grinding. The cylindrical portion on the workpiece is preferably effected with a first non-cylindrically realized grinding disk as a result of longitudinal peel-grinding. The profiled portion is produced with a second, profiled grinding disk as a result of profile grinding. For grinding the diameter and planar sides, the grinding disk is preferably dressed such that the so-called first cut of the grinding disk is dressed at an angle. The main machining when peel-grinding takes place, in this case, in the short conically dressed region of the grinding disk. The outer diameter of the grinding disk removes, in this case, relatively little metal, i.e. the surface thereof is only used for smoothing the surface. Surface grinding is also possible using such a grinding disk. With an axially parallel center axis of the grinding disk with reference to the center axis of the workpiece, a so-called jet cut remains on the ground surface when grinding planar sides. As said jet cut is often unwanted, the corresponding workpiece is preferably ground further on its diameters and planar sides with an angled grinding disk. The grinding of the diameter regions is also carried out using the peel-grinding method. The grinding of the planar sides is then ground with the angularly dressed side face of the grinding disk using the angular plunge grinding method.

It is preferably also possible, however, to grind several diameters at the same time or one after another in one or several plunge grinding operations using a wider grinding disk which is suitable for angular plunge grinding. In such a case, the grinding of the planar sides is also effected here using the angularly dressed side face of the grinding disk.

The first grinding disk is preferably arranged on a first grinding headstock, and the second grinding disk is further preferably arranged on a second grinding headstock. The advantage of separate grinding headstocks for the first grinding disk and for the second grinding disk consists in that there is a higher level of flexibility when grinding. Where there are two grinding headstocks and the arrangements thereof on both sides of the workpiece, there is additionally the option of processing certain portions on the workpiece at least partially simultaneously. Where there is simultaneous processing of corresponding regions on the workpiece and arrangement of the grinding headstocks on both sides of the workpiece, it is additionally possible to achieve that the grinding forces applied in the workpiece during grinding by the one grinding disk are compensated for by the other grinding disk at least to a considerable extent.

According to an embodiment, the workpiece is clamped between tips which are inserted in the end sides of the workpiece and define the longitudinal axis thereof. One of the tips is arranged on the tailstock and the other tip is arranged on the workpiece headstock. In the first clamping position, the tip, as a result of an axially directed compressive load, exerts a corresponding clamping pressure, which is sufficiently high at least for grinding the cylindrical portions and/or the planar sides, on the tailstock. The tip situated on the tailstock can be transferred from a state in which the axially directed compressive load is exerted onto the workpiece, into a pressureless state for releasing the clamping position. In such a pressureless state, the tip on the tailstock still engages in the centering bore on the workpiece on the side of the workpiece facing the tailstock and consequently secures the alignment of the workpiece along the longitudinal axis of the workpiece defined by the centering bores. As a result of the pressureless state of the tip on the tailstock, the workpiece has the opportunity to compensate for certain internal stresses released during grinding such that for the next grinding operation, with a new clamping position between the tips, the workpiece is able to be ground largely free of inner stresses.

To release the clamping position, i.e. to make the tip on the tailstock pressureless, the tailstock tip is moved along its Z axis. As a result, it is disengaged as it were from the centering bore pointing to the tailstock. "Disengaged" is to be understood in this context as the pressureless state of the centering tip in the centering bore of the workpiece where it is no longer possible for the workpiece to be driven rotationally by means of the clamping position between the tips.

Higher grinding forces, which are introduced into the workpiece by the respective grinding disk, occur, as a rule, when the profile portions are being ground. In order then to prevent the friction forces at the tip of the workpiece headstock possibly no longer being reliably sufficient to rotate the workpiece when the workpiece is solely clamped between tips with the relatively high grinding forces when grinding the profile portions, an additional clamping device, which clamps the workpiece additionally on the outer circumference of a cylindrical portion, is provided on the workpiece headstock. The additional clamping device preferably clamps the workpiece with its clamping jaws which cooperate with the circumference of the workpiece. If then the first clamping position is released between individual grinding operations when profile grinding, for example between profile pre-grinding and finish-grinding the profile, the clamping device must also be released when the tip at the tailstock is made pressureless for the purpose completely relaxing the workpiece. i.e. for compensating for the inner stresses thereof which are released during grinding.

First and foremost in the case of longer workpieces, at least one steady rest seat is ground in the first grinding operation, and the profiled portion is then pre-ground in the second grinding operation. In a third grinding operation, the cylindrical portion and the planar faces present on the workpiece are then finish-ground, the finish-grinding of the profiled portion following in a fourth grinding operation. Between all the consecutive grinding operations the clamping position is in each case released and the workpiece is then clamped again before the respectively following grinding operation begins.

Once the steady rest seat has been finish-ground, a steady rest is preferably provided on said steady rest seat for supporting the workpiece, once said steady rest has been ground. Supporting by means of a steady rest is advantageous first and foremost whenever, in the case of longer workpieces, grinding operations, where only one grinding disk engages the workpiece, are carried out. The grinding of the steady rest seat provides the first processing step, during which the workpiece is fixedly clamped in the machine, i.e. is situated in the first clamping position. Once the steady rest seat has been ground, further diameters with, where applicable, planar faces situated in between are then pre-ground or even immediately finish-ground. The grinding of the diameter also includes, in dependence on the workpiece geometry, the grinding of the planar faces which connect the individual diameter regions with varying diameters together.

The concept underlying the present invention is that inner stresses are removed as a result of releasing the clamping position between consecutively running grinding operations whilst simultaneously ensuring that the workpiece to be ground is held along the longitudinal axis defined by the tips on the workpiece headstock and on the tailstock and by the centering bores present in the end faces of the workpiece, which longitudinal axis provides the reference axis referred to for the grinding operation. In the case of subsequent grinding operations on the workpiece, grinding can then take place free of such inner stresses or with inner stresses that have at least been clearly reduced. The further grinding operation, which follows after the respective releasing of the clamping position, with a substantially stress-free state present in the interior of the workpiece, results in all cases in improved grinding results, and counter to prevailing opinion, according to which the workpiece, where possible, is to be held in said clamping position fixedly and without intermediate releasing of the clamping position during all the grinding operations.

The releasing of the tip on the tailstock side can also be effected in such a manner that the tip is retracted by a certain amount, i.e. no longer rests in the center. In this connection, the workpiece will then rest in said state on so-called receiving prisms and then be reclamped. The identical technical effect is achieved as a result of said method of operation as in the method of operation described previously.

BRIEF DESCRIPTION OF THE DRAWINGS

Further advantages and developments of the method according to the invention are now described in detail in the following figures. The drawings are as follows:

FIG. 5: shows a partial top view according to FIG. 3 when finish-grinding the central diameter and the planar sides of the workpiece according to the method according to the invention;

FIG. 6: shows a partial top view according to FIG. 3 when finish-grinding the toothing or the grooves of the workpiece according to the method according to the invention.

DETAILED DESCRIPTION

Figure 1:
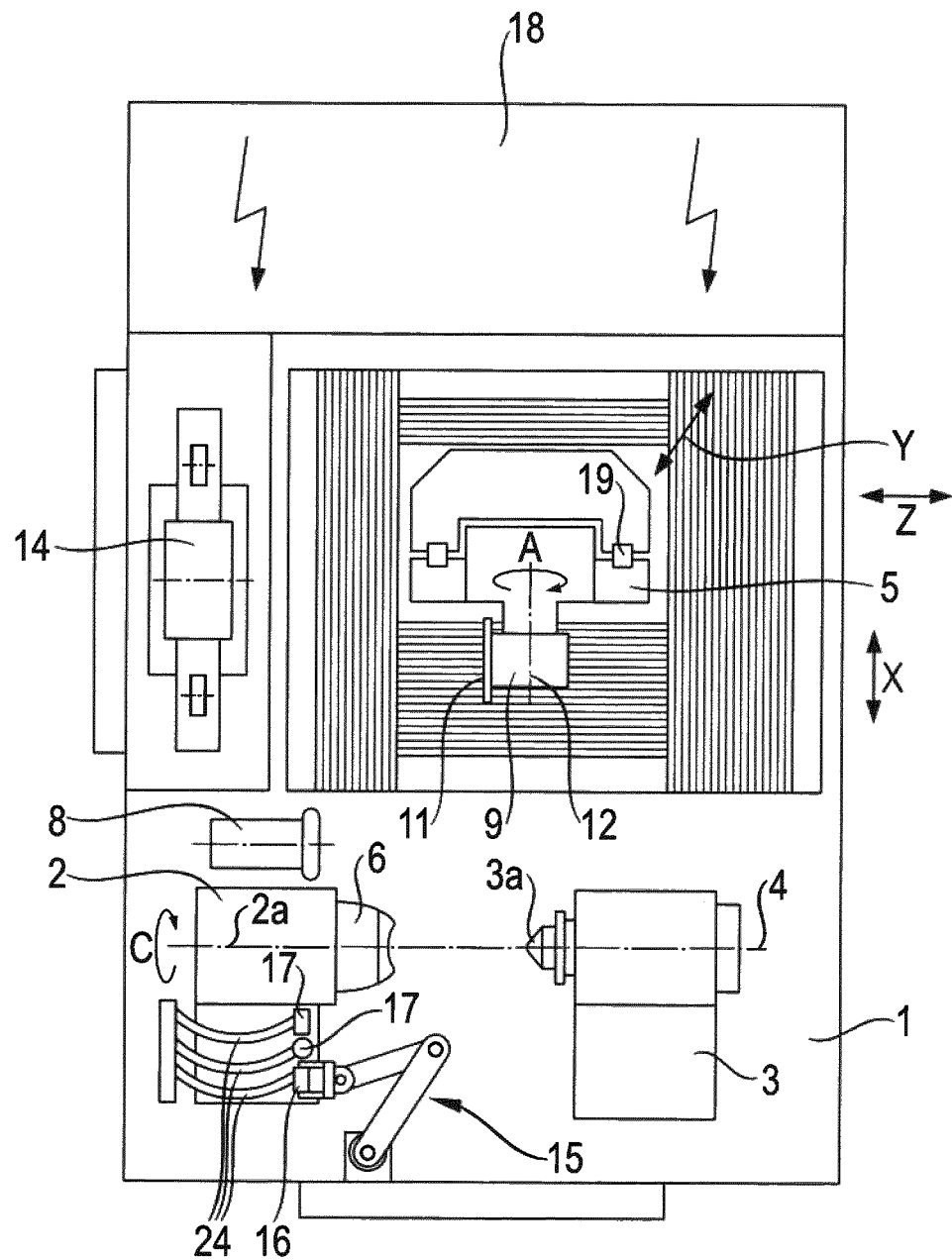
FIG. 1: shows a top view of a grinding machine for carrying out the method according to the invention with a grinding headstock and a station for clamping a workpiece.

FIG. 1 shows a top view of a grinding machine for carrying out the method according to the invention, where a workpiece is clamped such that it enables the execution of the method according to the invention for the complete grinding of shaft-type workpieces or shaft parts 10. The grinding machine shown in top view comprises as grinding center a machine base 1, a workpiece headstock 2, arranged on the machine base 1, with a CNC-controlled C axis and a tailstock 3. The workpiece (not shown) is clamped between the workpiece headstock 2 and the tailstock 3 such that the geometric longitudinal axis thereof coincides with the clamping and rotation axis 4. A compound slide is movable in a CNC-controlled manner parallel, which is indicated by the double arrow characterized as Z axis, and at right angles, which is indicated by the further double arrow designated as X axis, to the rotational axis 4 of the workpiece. The compound slide supports, by means of perpendicular guide tracks 19, movable in a CNC-controlled manner, which is shown by the Y axis which is also indicated as a double arrow, a first grinding headstock 5, on which is fastened a grinding spindle 9 with a grinding disk 11. A further CNC-controlled adjustment option consists as a result of a horizontal, CNC-controlled pivot axis 12 which is arranged at right angles to the rotation axis 4 of the workpiece and is characterized and shown as A axis.

Figure 2:
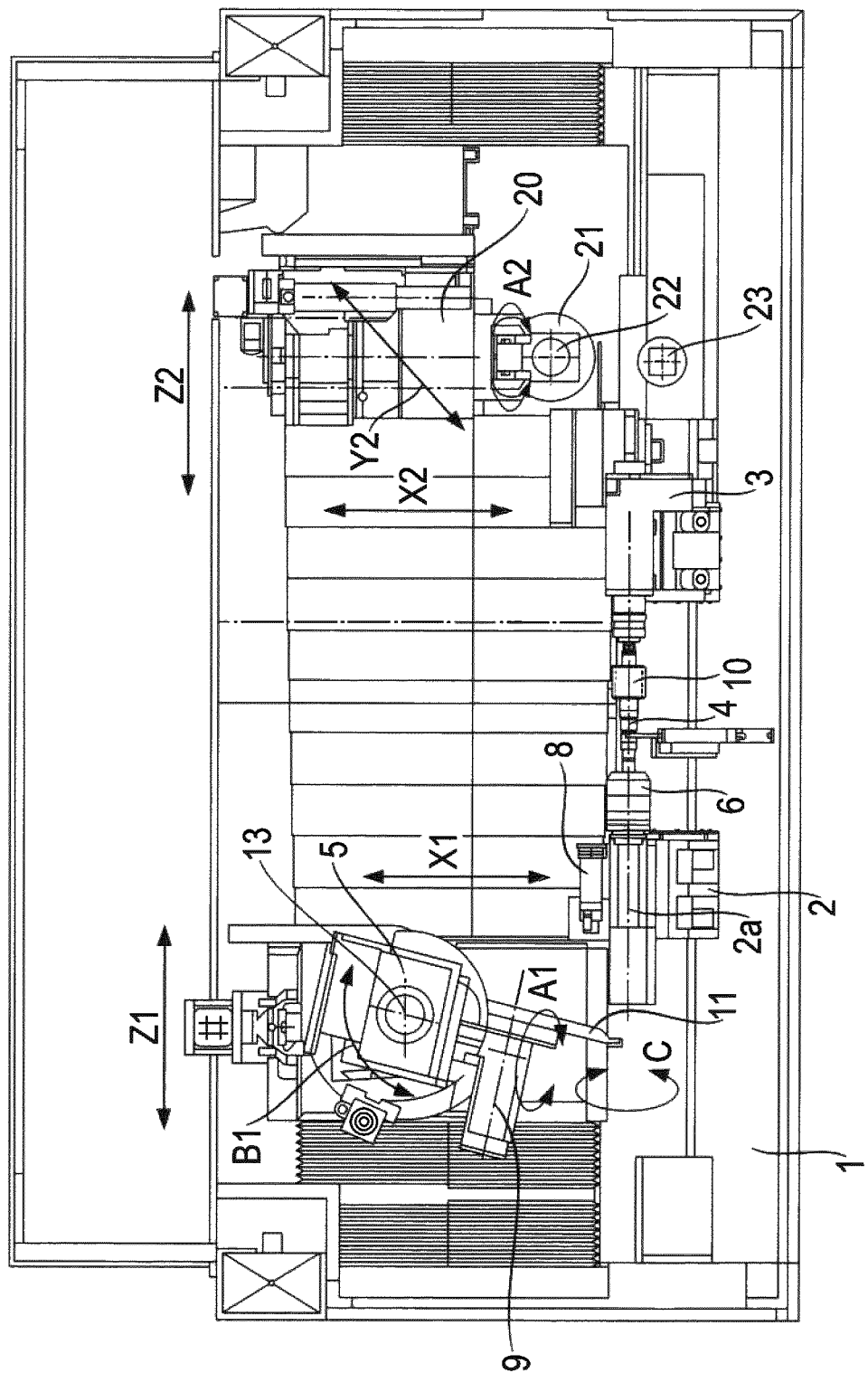
FIG. 2: shows a top view of a grinding machine for carrying out the method according to the invention with two grinding headstocks and one station for clamping a workpiece.

So that it is possible to use grinding disks in the angular plunge grinding method for grinding cylindrical or conical regions on the shaft part, a pivot axis, which has a vertically arranged pivot axis 13 and is designated as B axis in FIG. 2, is preferably provided above the slide for the Z axis. FIG. 1 does not show said pivot axis as it is only necessary for grinding with an angularly set grinding disk 11 for peel-grinding or angular plunge grinding. This means it can be ground using the angular plunge grinding method, or cones can also be ground as a result of pivoting the B axis. If said B axis, i.e. the pivot axis 13, is not present, it is, however, also possible to provide said processing from above onto the shaft diameter.

A dressing spindle 8, which supports a diamond wheel and is used to dress the grinding disk 11, is also provided. A device 14 for changing the grinding disk 11 is additionally shown. The grinding disks, in this case, are received in a holder in the manner of a hopper and are fed by means of the implementation robot 15 from the hopper to the respective grinding spindle. The implementation robot 15 comprises a gripper unit 16, by means of which it removes the desired grinding disk as required out of the storage hopper and optionally also a certain cooling nozzle set 17 associated with the grinding disk and feeds both of these into the region of the effective position of the grinding disk on the workpiece. It is also possible for the cooling nozzle set 17 to be gripped independently of the grinding disk by the implementation robot and guided to the grinding engagement point, which can be effected during grinding.

Provided in the rear region of the grinding machine, shown at the top in FIG. 1, is a switching cabinet 18 which includes the CNC control unit of the grinding machine, by way of which the grinding machine is controlled.

FIG. 2 shows a top view of a grinding machine for carrying out the method according to the invention, said grinding machine comprises a first grinding headstock 5 and a second grinding headstock 20. In this case, only the basic design of the grinding machine is shown in the top view. In the case of said grinding center, a workpiece headstock 2 and a tailstock 3 are arranged on a machine base 1. The clamping and rotation axis 4 for the workpiece 10, which coincides with the longitudinal axis of the workpiece, is realized between the workpiece headstock 2 and the tailstock 3. A chuck 6, which receives a centrally revolving tip which is not shown and also has compensating clamping jaws 6a (not shown either), is mounted on a workpiece spindle 2a of the workpiece headstock 2 (C axis). Said clamping jaws clamp the workpiece fixedly on the circumference thereof. Said chuck is provided first and foremost for the purpose of introducing greater driving torque into the workpiece. This is necessary, for example, at least when grinding the profile portions of the workpiece 10. In order to be able to compensate for concentricity errors with reference to the center realized by the clamping and rotation axis 4 and for all the other dimensional and geometric tolerances at the clamping point, the clamping jaws 6a of the chuck 6 are realized in a compensating manner. Such applications for chucks are already disclosed in the prior art such that the description of the mode of action thereof is dispensed with here.

A first compound slide which is shown on the left in FIG. 2, is movable in a CNC-controlled manner parallel, which is shown by the Z1 axis in the form of a double arrow, and at right angles, which is shown on the left in FIG. 2 by the X1 axis which is also in the form of a double arrow, to the rotational axis 4 of the workpiece 10. The first compound slide supports a first grinding headstock 5, on which is fastened a first grinding spindle 9 with a first grinding disk 11. Further CNC-controlled adjustment options are provided as a result of a horizontal adjustment option with respect to the workpiece longitudinal axis 4 (A1 axis) and an adjustment option via the CNC-controlled pivot axis (B1 axis) arranged vertically at right angles with respect to the rotation axis 4 of the workpiece 10. The first grinding spindle 9, which serves for receiving the grinding disk 11, is shown mounted in the foreground of FIG. 2. The grinding disks 11 can be changed fully automatically on said grinding spindle 9 in a program-controlled manner by means of a grinding disk changing device (not shown). The suitable cooling lubricant nozzle or the suitable cooling lubricant nozzle set for the grinding disk must then also be exchanged in the known manner, which is not shown separately in FIG. 2.

The cylindrical diameters and the planar faces on the workpiece 10 are ground using the first grinding headstock 5 shown on the left in FIG. 2.

In addition, on the left-hand side in FIG. 2 axially parallel to the workpiece spindle 2a (C axis) is arranged a dressing spindle 8 which serves with its diamond wheel for dressing the first grinding disk 11 of the first grinding headstock 5. The device for changing the grinding disk 11 is not shown separately in FIG. 2. The grinding disks 11 of the first grinding headstock 5 serve for grinding the shaft parts or the cylindrical portions on the shaft part, i.e. all outer diameters for the cylindrical portions, cone-shaped portions and similar contours are ground using said grinding disks.

On the right-hand side in FIG. 2, a second compound slide is movable in a CNC-controlled manner parallel, which is characterized as the Z2 axis with a double arrow, and at right angles, which is shown in FIG. 2 as the X2 axis also with a double arrow, to the rotational axis 4 of the workpiece 10. Said second compound slide supports a second grinding headstock 20 which is movable perpendicularly in a CNC-controlled manner (Y2 axis) and on which is fastened a grinding spindle 22 with a second grinding disk 21. A further CNC-controlled adjustment option consists, as a result of a CNC-controlled pivot axis which is arranged horizontally with respect to the rotation axis 4, of the workpiece 10 and is shown as A2 axis in FIG. 2. A grinding spindle, which serves for receiving the grinding disk 21, is mounted in the foreground of the grinding machine according to FIG. 2. Said grinding disks can be changed fully automatically on said grinding spindle 22 (see FIG. 4B) in a program-controlled manner by means of a grinding disk changing device (not shown either). The suitable cooling lubricant jet or the suitable cooling lubricant nozzle set for the second grinding disk 21 is then also exchanged in the known manner—insofar as is necessary—which is not shown separately either.

A second dressing device 23 for dressing the grinding disk 21 for the grinding headstock 20 shown on the right in FIG. 2 is provided at the front in the grinding machine on the right-hand side of the machine.

The switching cabinet, which receives the complete electric control unit of the machine and is not shown in FIG. 2, is arranged in the rear region of the grinding machine.

For grinding, in terms of a loading or unloading operation, the respective workpieces 10 are fed to or removed from the grinding machine in a manner known per se, for example via an inside loading portal or through a loading portal arranged above the grinding machine.

The principle design of a grinding machine shown in FIGS. 1 and 2 serves for carrying out the method according to the invention, because with said basic design of the grinding machine, the complete processing of the workpiece comprising cylindrical portions, planar sides and profile portions is realizable in such a manner that as a result of the processing or during the processing inner stresses released in the workpiece can be removed or compensated for between grinding operations such that subsequent grinding operations can always be carried out on a workpiece released at least largely from inner stresses. The sequence of the method according to the invention is now explained in more detail by way of the following figures.

Figure 3:
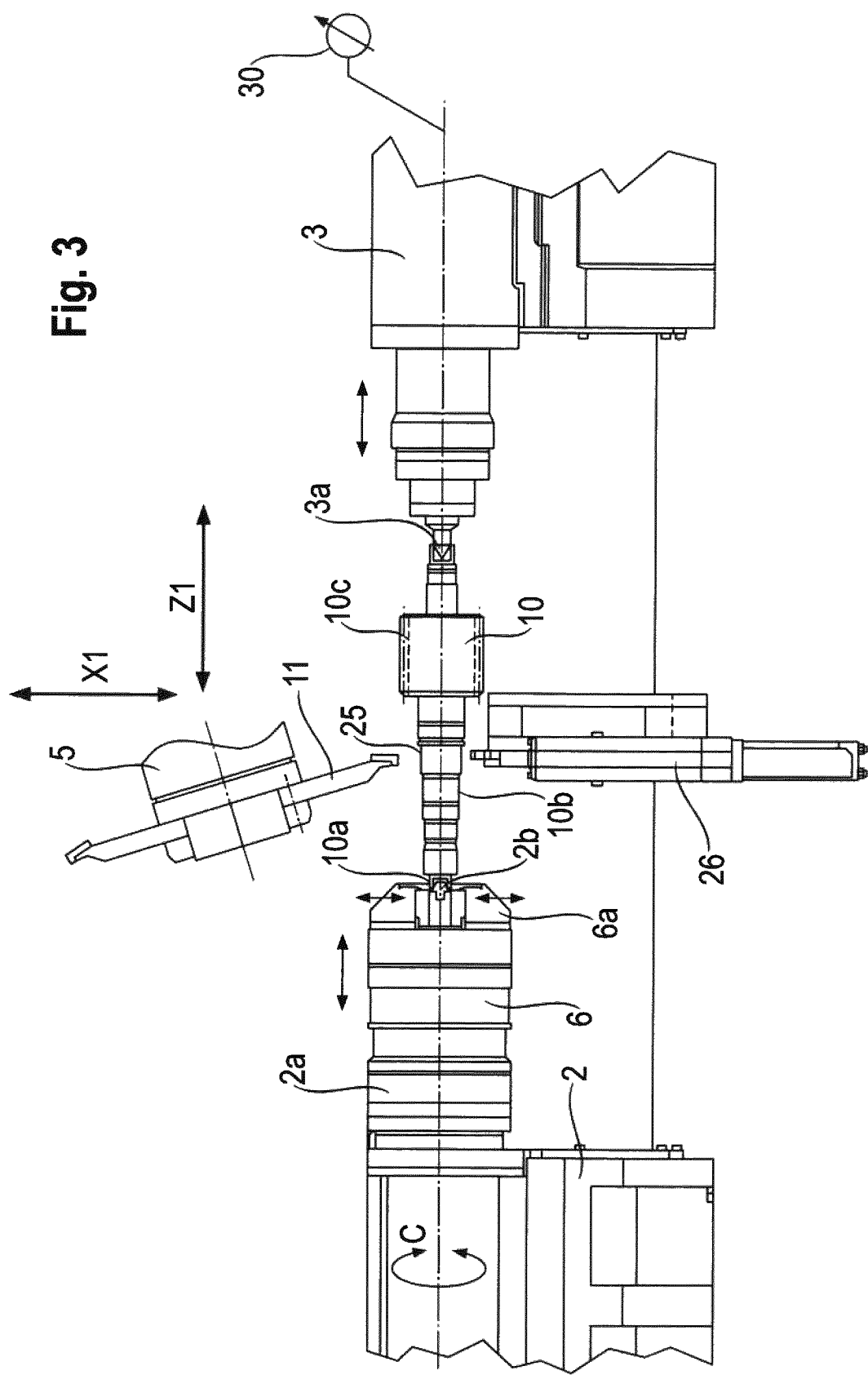
FIG. 3: shows a partial top view of a workpiece clamped between tips for the execution of the method according to the invention prior to the start of the grinding of a steady rest seat.

FIG. 3 is a partial top view of part of the grinding machine realizing the method according to the invention where the workpiece is clamped between tips before the grinding of a steady rest seat is realized. FIG. 3 shows a schematic representation of said complete processing of a workpiece 10 in the form of a shaft part. Said shaft part is received in a clamping position between tips 2b, 3a between a workpiece headstock 2 with a CNC-controlled C axis and a tailstock 3. In order to apply the necessary torque in the grinding operations, and certainly in particular for the grinding of the profile portions, a compensating and axially retractable chuck 6, which is already disclosed per se in the prior art, is entrained on the workpiece spindle 2a on a shaft-side shaft end 10a. In the extended position of the chuck 6 or of its clamping jaws 6a, said workpiece can be fixedly clamped at the shaft-side shaft end 10a of the workpiece 10 such that very high radial torques are transmitted to the workpiece 10 during the grinding operation. This becomes necessary in the majority of cases when grinding profile portions 10c in the form of groove or tooth geometries. According to the representation in FIG. 3, the clamping jaws 6a of the chuck are placed onto the clamping region of the workpiece, i.e. onto the shaft-side shaft end thereof. Consequently, it is not possible to grind the cylindrical outer contour of said shaft-side shaft end in such a clamped state. It is consequently necessary for grinding said clamping region for the clamping jaws 6a to be released from the workpiece 10 and the chuck with its clamping jaws 6a to be retracted. The workpiece, however, remains fixedly clamped between the tips 2b, 3a for grinding said cylindrical outer regions. In this case, the entrainment of the workpiece 10 for the rotation thereof is effected by the friction between the centering tip 2b on the chuck and the center present in the workpiece 10, in which said centering tip 2b engages. A tailstock 3, which engages in the center arranged facing the centering tip 3a of the tailstock 3 as a result of preferably hydraulic actuation, is provided on the side located opposite the workpiece headstock. The tailstock tip 3a is movable in the axial direction of the workpiece such that, with corresponding realization of axial pressure, the workpiece is held in a centered manner between the two centering tips 2b and 3a such that rotary entrainment by the workpiece headstock 2 is ensured.

The grinding of a steady rest seat 25 is then effected in the manner shown in FIG. 3 according to the peel-grinding method using the angularly set grinding disk 11. Once said grinding operation for grinding the steady rest seat has been completed, the clamping position of the workpiece 10 is released such that the workpiece is able to relax and the inner stresses are released. In addition, the chuck with its clamping jaws is released from the workpiece. In said state, the tailstock tip 3a is made pressureless and only rests in the center of the shaft part. As a result, the workpiece is no longer fixedly clamped, nevertheless, however, its central position with reference to the clamping and rotation axis 4, i.e. to the geometric longitudinal axis 4 of the workpiece, is maintained. A loss in precision cannot occur, rather the precision of the grinding result is increased as a result of the workpiece having the possibility of being relaxed between the two consecutive grinding operations such that subsequent grinding operations can be ground on a relaxed workpiece, i.e. a workpiece that is substantially free of inner stresses.

In principle, it would also be conceivable to release the tailstock tips 3a completely out of the center for the clamping position; in such a case, however, it would have to be ensured by means of, for example, an additional gripper or a further supporting means that the workpiece was supported in said state. Once the relaxing operation has been performed, during which the grinding operation is obviously interrupted, the workpiece is clamped anew such that a subsequent grinding operation is able to follow.

Figure 4A:
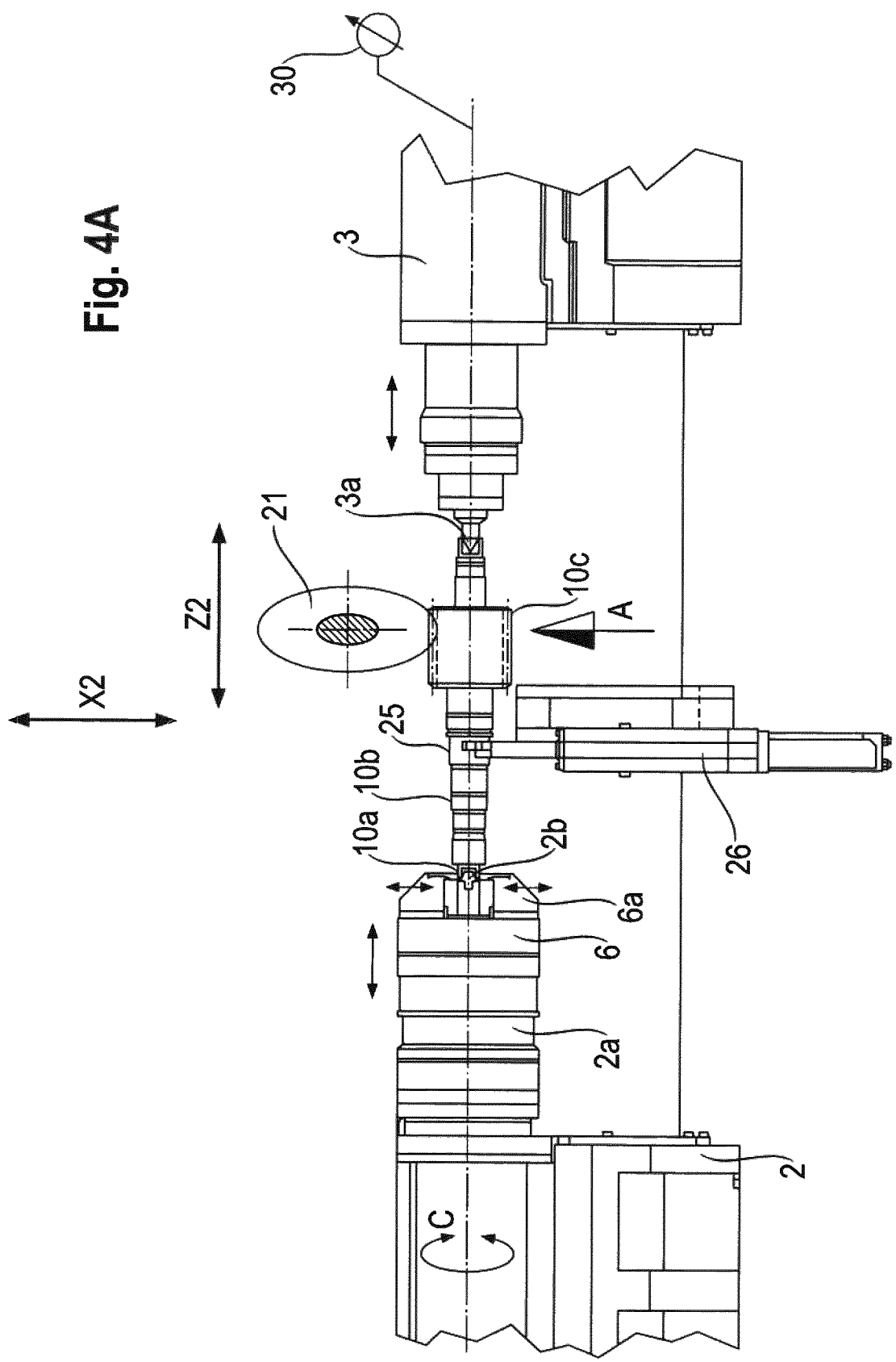
FIG. 4A: shows a partial top view according to FIG. 3 when pre-grinding the profile portion in the form of a toothing or grooves with a supporting steady rest.

FIG. 4A shows a partial top view according to FIG. 3 when pre-grinding the profile portion in the form of a toothing or of grooves with an engaged/supporting steady rest. The pre-grinding of the profile portion 10c is effected by means of an electroplated grinding disk 21. This is effected in a manner known per se by means of an interpolating process via the CNC-controlled axis or by means of the CNC-controlled axes. With reference to the precision to be obtained, the electroplated grinding disks 21 are well suited for pre-grinding, first and foremost also because they are able to realize a very high metal removal rate per unit time.

After said grinding operation as the pre-grinding of the profile portion 10c, the clamping position of the workpiece is released to compensate for the inner stresses, which are present, where applicable, in the workpiece as a result of the grinding operation, in such a manner that the clamping jaws 6a of the chuck 6 are released and the tailstock tip 3a only still remains in a pressureless manner in the center of the shaft part 10. As a result, the workpiece is no longer fixedly clamped, but maintains its defined position, which is important with reference to the precision for subsequent grinding operations. Once the workpiece 10 has been relaxed, said workpiece is fixedly clamped again in the known manner after the inner stresses in the workpiece have been released as a result of releasing the clamping position. The relaxing of the workpiece, in this case, is sensible preferably both after the pre-grinding and after the finish-grinding of individual portions, at any rate for as long as it takes to complete the process on the workpiece.

FIG. 4a now shows the workpiece 10 clamped between the tips 2b and 3a with the chuck 6 with the clamping jaws 6a thereof applied at the same time. The workpiece comprises a shaft-side shaft end 10a, cylindrical portions 10b which are delimited by planar sides, and profile portions 10c. A steady rest 26 is applied on a ground steady rest seat 25 for supporting the relatively long shaft-type workpiece. The chuck 6 with the inside centering tip 2b is fastened on the workpiece spindle 2a of the workpiece headstock 2. When—as shown in FIG. 4A—the profile portion 10c is ground by means of the grinding disk 21, the clamping device 6 remains clamped with its clamping jaws 6a on the shaft-side shaft end 10a. In order to be able to grind the corresponding profile portions, the grinding disk 21 can be delivered corresponding to the geometric form of the profile portion by means of its grinding headstock (not shown) and by means of the grinding spindle supporting the grinding disk 21 on the grinding headstock via the two axes X2 and Z2.

A pressure control means 30, by means of which the axial pressure of the tailstock tip 3a onto the center arranged on the end-face end of the workpiece is adjustable in a preselectable manner in the CNC control unit, is shown on the tailstock 3. Said axial pressure serves for securing the clamping forces during the grinding operation. To relax, the tailstock tip 3a is made pressureless in its associated center of the workpiece 10, consequently the workpiece is made stress-free with reference to its clamping position.

Figure 4B:
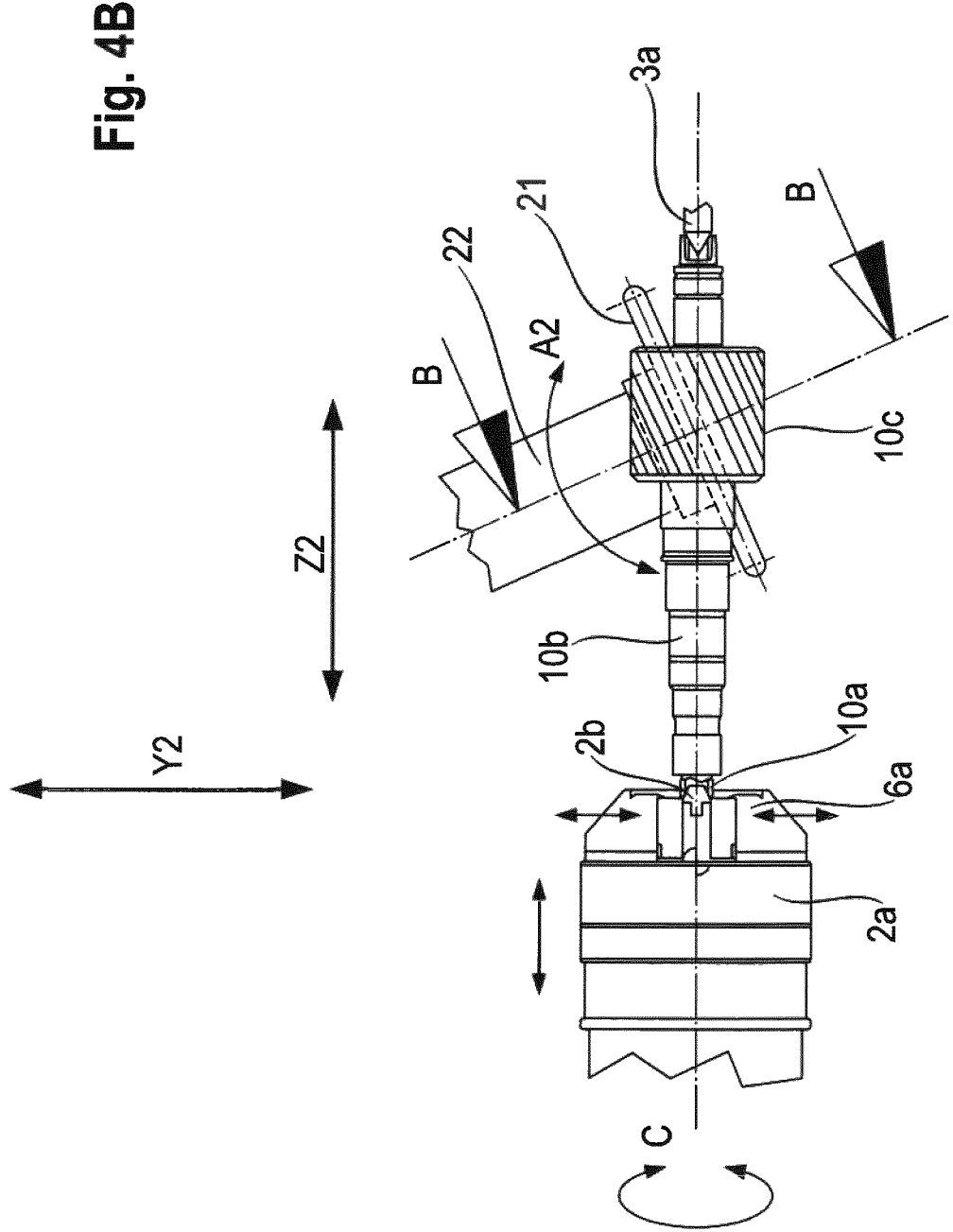
FIG. 4B: shows a partial view in the direction A of the workpiece according to FIG. 4A during the grinding of its profile portion.

FIG. 4B shows a partial view in the direction A of the workpiece which corresponds to the grinding state according to 4A, during the grinding of its profile portion.

The clamping situation shown in FIG. 4B corresponds, in this case, to that according to FIG. 4A. According to said partial view, the workpiece 10 is in the process of being ground on the profile portion 10c. The adjustment axes A2, Y2 and Z2 are shown by respective double arrows. The workpiece is shown in the foreground as being held between the tips 2b and 3a. The grinding disk 21 for grinding the profile portion 10c is shown behind the workpiece with reference to the drawing plane according to FIG. 4B and is angled with its grinding spindle 22 such that the sloping straight grooves in the profile portion 10c can be ground by a corresponding interpolating procedure between the axes Z2 and C.

Figure 4C:
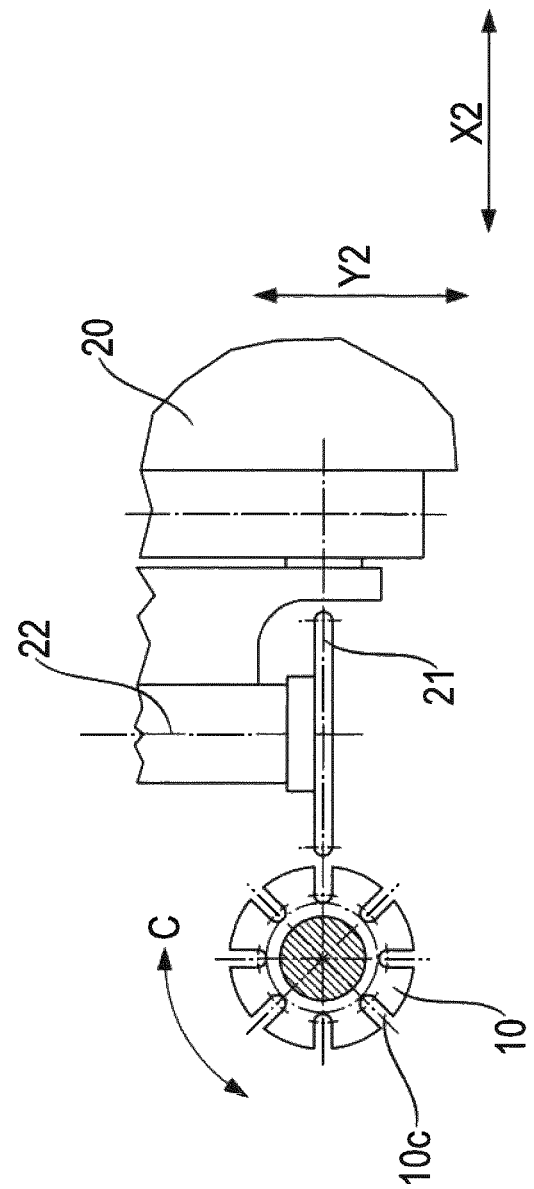
FIG. 4C: shows a partial sectioned view B-B according to FIG. 4B during the grinding of the profile portion of the workpiece realized as straight longitudinal grooves.

FIG. 4C then shows the grinding situation according to FIG. 4B with reference to the cutting plane B-B. The profile portion 10c on the workpiece 10 is shown in the form of a toothing or in the form of several grooves extending in the longitudinal direction of the workpiece distributed on the circumference. The grinding disk 21 is received by its grinding spindle 22 and is pivotable at the angle of slope of the sloping toothing in a CNC-controlled manner via the A2 axis. The C, Y2 and the X2 axes are also shown schematically by means of respective double arrows. Depending on the requirement, a profile portion can be ground with the method according to the invention even with curved grooves as in the case of screw rotors.

FIG. 5 shows a partial top view according to FIG. 3 when finish-grinding the cylindrical portions and the planar sides of the workpiece according to the method according to the invention. The basic design corresponds to that according to FIG. 3 such that said basic design is not stated once again here.

The basic principle that the workpiece remains clamped during the implemented grinding operation, after the same, however, the clamping is released so that inner stresses in the workpiece are able to be released and a stress-free state of the workpiece can be ensured for subsequent grinding operations. The finish-grinding of the relevant portions is effected in the version shown according to FIG. 5 according to the peel-grinding method with an angled grinding disk 11. It is also possible, in principle, for the grinding of said portions to be able to be effected with an angled grinding disk 11 such that repeated plunging is necessary. In said case, the cylindrical portions are ground using the angular plunge grinding method. Once the cylindrical portions have been finish-ground, the workpiece 10 is once again relaxed, i.e. after said grinding operation, the clamping position of the workpiece 10 is released so that it is able to relax, this being effected in such a manner that the clamping jaws 6a of the chuck 6 are released and the tailstock tip 3a only still rests in a pressureless manner in the center of the shaft part 10. As a result, the workpiece is no longer clamped so that the inner stresses released or generated during grinding are released and in the case of renewed grinding, the workpiece is in a processing state that is free of inner stresses.

FIG. 6 shows a side view of the region of the grinding machine in which the workpiece is clamped, during grinding of the profile portion 10c according to the method according to the invention.

The basic design and the method of operation during grinding or between individual grinding operations corresponds to what has previously been described with reference, in particular, to FIGS. 3 and 5 such that said basic design will not be described again. The finish-grinding of the profile portion 10c is effected according to FIG. 6. The profile portion 10c is realized in the present example as a helical cut toothing, the grinding being effected with an electroplated or vitrified grinding disk 21. A vitrified grinding disk can preferably be used in order to finish-grind the profile portion 10c. The finish-grinding is effected in a manner known per se as a result of an interpolating process of the various CNC-controlled axes for the second grinding disk 21. It is obvious that to achieve a very high level of precision, the electroplated grinding disks 21 for the finish-grinding have to have a very high level of precision. When using vitrified grinding disks 21, they are provided with the required profile as a result of dressing. Said latter operation is unnecessary insofar as the necessary precision on the finished workpiece 10 can already be achieved by the pre-grinding operation described previously for the profile portion. In such a case, the pre-grinding described in FIGS. 4A, B, C would be the same as the finish-grinding operation. Once the finish-grinding operation of the profile portion 10c has been completed, the clamping position for the workpiece is released and the same is removed from the machine using a suitable handling system.

Figure 7:
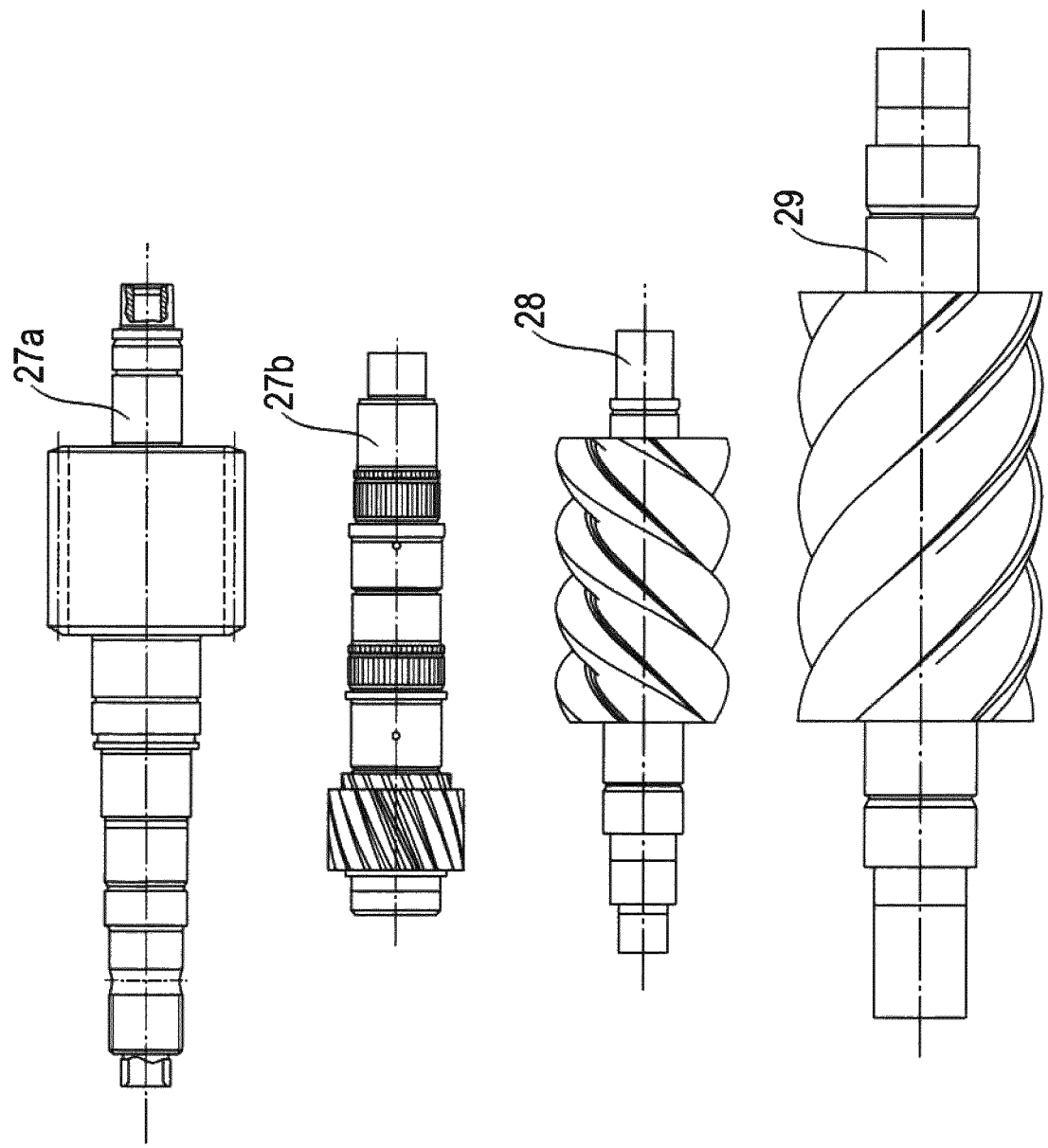
FIG. 7: shows examples of workpieces with cylindrical, planar shoulder and profile portions that can be ground using the method according to the invention.

Finally, FIG. 7 shows, as an example, shaft-type workpieces which can be ground using the method according to the invention. Said shaft-type workpieces comprise cylindrical portions and also profile portions. In this case, there is a gear shaft 27a, a further gear shaft 27b, the latter comprising three profile portions, and two rotor shafts 28/29 for compressors, blower vacuum pumps or displacement pumps. It is clear from said shaft-type components with profile portions, which are only given as an example, that said components are highly complex ground surface constructions which additionally require a very high level of production precision because said shafts roll along one another by way of perfectly fitting corrugation crests and the respective flanks. When the shafts shown have to be used for compressors or displacement pumps, the requirements are even higher because along with the simple rolling, a sealing function is to be ensured in the profiles when two such shafts produced together mesh with one another.

It has been shown in a surprising manner that to achieve improved dimensional and geometric precision, the complete grinding of such relatively complicatedly designed shaft-type workpieces does not immediately require one single clamping position that is not released during the entire processing procedure.

The invention claimed is:

1. A method for grinding workpieces, which comprise at least one cylindrical portion and profiled portion each, on one and the same grinding machine, which comprises only one workpiece headstock and one tailstock, wherein the cylindrical portion is ground with a first non-cylindrically realized grinding disk, wherein the workpiece is ground in a first grinding operation in a first clamping in the grinding machine, wherein the first clamping is released after the first grinding operation, in that then a second clamping is generated, in that the workpiece is subsequently ground in a second grinding operation and in that the profiled portion is produced as a result of profile grinding with a second, profiled grinding disk, wherein the workpiece is clamped between tips which define the clamping and rotation axis thereof and engage in centering bores provided in the end sides thereof, wherein one of the tips is arranged in the tailstock and in the first clamping position exerts an axially directed compressive load onto the workpiece which is, to release the clamping position, transferred into a pressureless state where the tip is still engaged in the centering bore and alignment of the workpiece is secured at its longitudinal axis defined by the centering bores.

2. The method as claimed in claim 1, wherein in the case of further grinding operations, the clamping position is in each case released and the workpiece is then clamped again before the following grinding operation begins.

3. The method as claimed in claim 2, wherein the first grinding disk is arranged on a first grinding headstock.

4. The method as claimed in claim 2, wherein the second grinding disk is arranged on a second grinding headstock.

5. The method as claimed in claim 1, wherein for releasing the clamping position, the tailstock tips is moved along its Z axis and is disengaged from the centering bore of the workpiece which points to the tailstock tip.

6. The method as claimed in claim 1, wherein the workpiece is clamped in its clamping position by way of an additional clamping device which cooperates with the outer circumference of a cylindrical portion of the workpiece, in particular by means of clamping jaws.

7. The method as claimed in claim 1, wherein in the first grinding operation at least one steady rest seat is ground, in the second grinding operation the profiled portion is pre-ground, in a third grinding operation the cylindrical portion and planar surfaces present on the workpiece are finish-ground and in a fourth grinding operation the profiled portion is finish-ground, wherein between all the consecutive grinding operations the clamping position is in each case released and the workpiece is then clamped again before the following grinding operation begins.

8. The method as claimed in claim 7, wherein a steady rest is provided for supporting the workpiece on the steady rest seat once said steady rest seat has been ground.

9. The method as claimed in claim 1, wherein the cylindrical portions are produced as a result of longitudinal peel-grinding or plunge grinding and the profiled portions as a result of profile grinding.

10. A method for grinding workpieces, which comprise at least one cylindrical portion and profiled portion each, on one and the same grinding machine, which comprises only one workpiece headstock and one tailstock, wherein the cylindrical portion is ground with a first non-cylindrically realized grinding disk, wherein the workpiece is ground in a first grinding operation in a first clamping in the grinding machine, wherein the first clamping is released after the first grinding operation, in that then a second clamping is generated, in that the workpiece is subsequently ground in a second grinding operation and in that the profiled portion is produced as a result of profile grinding with a second, profiled grinding disk, wherein in the first grinding operation at least one steady rest seat is ground, in the second grinding operation the profiled portion is pre-ground, in a third grinding operation the cylindrical portion and planar surfaces present on the workpiece are finish-ground and in a fourth grinding operation the profiled portion is finish-ground, wherein between all the consecutive grinding operations the clamping position is in each case released and the workpiece is then clamped again before the following grinding operation begins.

* * * * *